United States Patent [19]

Ansley et al.

[11] Patent Number: 5,546,492
[45] Date of Patent: Aug. 13, 1996

[54] FIBER OPTIC RIBBON DISPLAY

[75] Inventors: David A. Ansley, Sterling; Ashok Sisodia, Herndon, both of Va.

[73] Assignee: Hughes Training, Inc., Los Angeles, Calif.

[21] Appl. No.: 356,981

[22] Filed: Dec. 15, 1994

Related U.S. Application Data

[63] Continuation-in-part of Ser. No. 187,957, Jan. 28, 1994, Pat. No. 5,416,876.

[51] Int. Cl.$^6$ ............................................ G02B 6/06
[52] U.S. Cl. ........................ 385/116; 345/8; 348/115; 359/630
[58] Field of Search .................. 385/114–119, 147; 359/197–199, 201, 204, 209, 618, 630–633; 340/815.42, 815.43, 815.45; 345/7–9, 30–32; 348/115, 804; 358/901.1

[56] References Cited

U.S. PATENT DOCUMENTS

| | | | |
|---|---|---|---|
| H779 | 5/1990 | Verona | 359/630 |
| 4,311,999 | 1/1982 | Upton et al. | 340/755 |
| 4,347,508 | 8/1982 | Spooner | 345/8 |
| 4,349,815 | 9/1982 | Spooner | 345/8 |
| 4,439,157 | 3/1984 | Breglia et al. | 359/618 X |
| 4,831,370 | 5/1989 | Smoot | 345/31 |
| 5,003,300 | 3/1991 | Wells | 345/8 |
| 5,189,512 | 2/1993 | Cameron et al. | 348/838 |
| 5,319,490 | 6/1994 | Ansley | 359/630 X |
| 5,416,876 | 5/1995 | Ansley et al. | 385/116 |

OTHER PUBLICATIONS

"Eyeglass Heads–Up Display", Upton et al., Proc. SID, vol. 23/2, 1982, pp. 77–80 (No Month Indicated).

*Primary Examiner*—John D. Lee
*Attorney, Agent, or Firm*—Jeannette M. Walder; Wanda K. Denson-Low

[57] ABSTRACT

A lightweight fiber optic television display useful for front and rear projection systems. An array of pixels such as a fiber optic (FO) ribbon has an input end which receives input light illuminating the pixels so as to create a first dimension of the display. The output end of the FO ribbon is moved relative to the observer to create a second dimension. The FO ribbon is clamped by a clamp near the output end and vibrated by a driver so that the output end of the ribbon is moved to obtain the second dimension. A lens is disposed between the vibrating end of the FO ribbon and a projection screen, and images the two dimensional image formed by the vibrating output end of the ribbon onto the screen. The projection screen may be either a rear or front projection screen. The FO ribbon may include a single row of fibers, or multiple rows to improve the image quality.

50 Claims, 8 Drawing Sheets

FIBER OPTIC RIBBON DISPLAY

This is a continuation-in-part of commonly assigned application Ser. No. 08/187,957, filed Jan. 28, 1994, (now U.S. Pat. No. 5,416,876).

FIELD OF THE INVENTION

This invention relates to improved lightweight fiber optic ribbon front and rear projection screen displays.

BACKGROUND OF THE INVENTION

A two-dimensional display such as a television has rows and columns of picture elements, or pixels. A one-dimensional display, such as a flying spot scanner or a ribbon of optical (glass or plastic) fibers, has just one row of pixels. The second dimension is created by moving the one-dimensional display relative to the observer. This movement is usually accomplished by rotating a mirror on a galvanometer shaft or by rotating a mirror faceted polygon.

In a known type of helmet-mounted display (HMD), shown in FIG. 1, the light is amplitude modulated at television video rates using an acousto-optical modulator. A rotating mirror faceted polygon scans the light onto the input end of a fiber optic (FO) ribbon via a pair of relay mirrors. The output end of the FO ribbon is positioned one focal length from a lens. One focal length away on the other side of the lens is a mirror mounted on the shaft of a galvanometer. Alternatively, a rotating mirror faceted polygon can be substituted for the galvanometer. The light is reflected by the mirror and passes through the lens again and focuses onto a rear projection screen. The height on the screen is a function of the angle of the mirror. The television image on the screen is relayed by the projection optics, reflects from the partially reflective visor and finally reaches the observer's eyes.

In such a HMD, the complexity of the lens design is affected by the angle of the light exiting the FO ribbon; the smaller the cone angle, the simpler the lens. The optical diffraction limit dictates the minimum cone angle. For example, if the center-to-center fiber spacing is four microns, the minimum cone angle is 4.76 degrees (f-number=F/6). Otherwise, the image of the individual fibers cannot be spatially resolved.

The HMD requires a larger cone angle (typically 18.4 degrees). In order to meet this requirement, the screen must scatter the incident light into a larger cone angle. Unfortunately, scattering in the screen negatively affects the display resolution and contrast. For most applications, color is required. This further increases the complexity and weight of the lens.

SUMMARY OF THE INVENTION

A two-dimensional fiber optic projection display system is described. The system includes an array of flexible light conductors arranged in a ribbon having an input end and an output end. Preferably, the light conductors are glass or plastic optical fibers. The display further includes means for injecting light into the ribbon input end to create a first dimension of the two-dimensional display, e.g., a polygon scanner for scanning a laser beam across the row of pixel input ends of the ribbon.

The display system further includes means for moving the output end of the ribbon in relation to an observer to create the second dimension of the two-dimensional display. In a preferred embodiment, the means for moving the output end includes clamping means for clamping the ribbon at a location spaced from the output end to create a cantilevered ribbon section, and driver means for vibrating the cantilevered ribbon section to deflect the output end of the ribbon. The output end of the ribbon is moved or vibrated at the television field rate.

The system further includes a projection screen, and means for imaging an image produced by the vibrating output end of said ribbon onto the projection screen for viewing by an observer. The imaging means preferably comprises an optical lens interposed between the output end of the ribbon and the projection screen. The projection screen can be a rear projection screen, wherein the imaging means projects light from the output end of the ribbon onto a first surface of the screen, and the observer views the image at a second opposite surface of the screen, or a front projection screen wherein the imaging means projects light from the output end of the ribbon onto a first front surface of the screen, and the observer view the image at the first front surface.

The array of fibers can be a single row of optical fibers, or a plurality of aligned rows of optical fibers, wherein fibers in a given row are offset relative to corresponding fibers in an adjacent row to provide overlap.

BRIEF DESCRIPTION OF THE DRAWING

These and other features and advantages of the present invention will become more apparent from the following detailed description of an exemplary embodiment thereof, as illustrated in the accompanying drawings, in which:

FIG. 7A shows a single row fiber, FIG. 7B a two row arrangement with 100% pixel overlap, and FIG. 7C a four row pixel arrangement.

DETAILED DESCRIPTION OF THE PREFERRED EMBODIMENT

Figure 1:
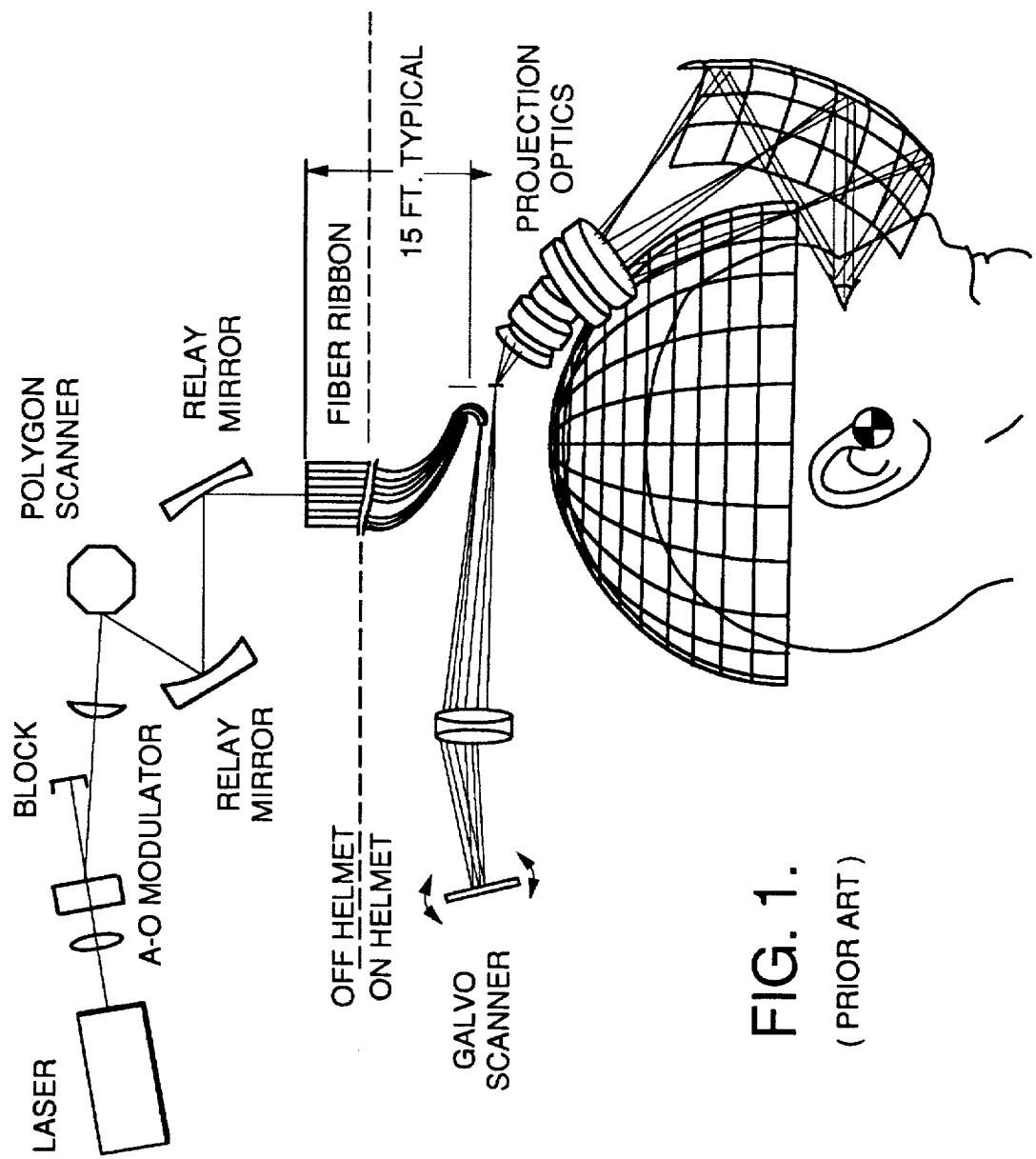
FIG. 1 is a schematic diagram of a conventional head/helmet mounted display (HMD).
Figure 2:
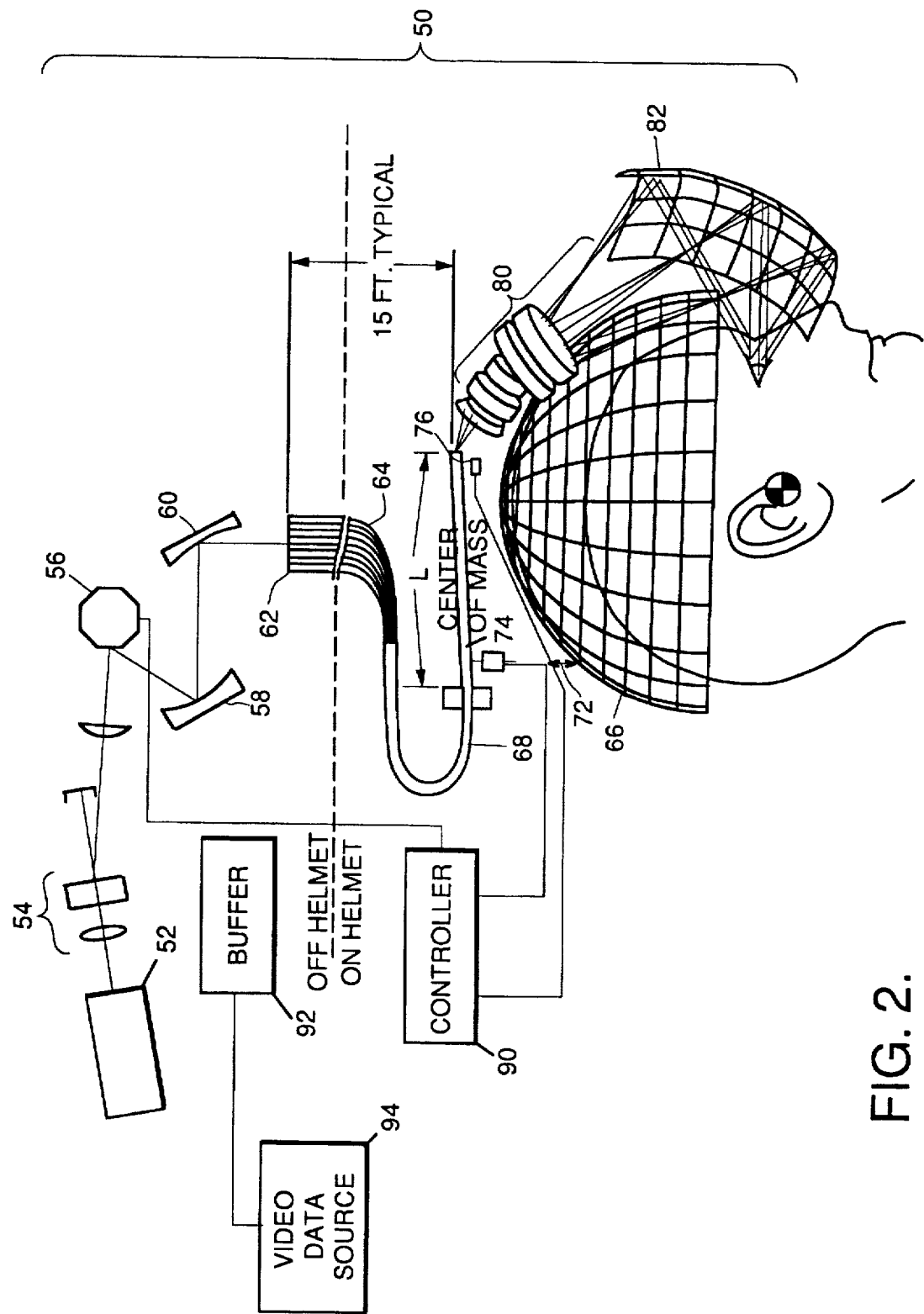
FIG. 2 illustrates an HMD embodying the present invention.

FIG. 2 shows a HMD employing the present invention. While the preferred embodiment is illustrated in the context of a helmet mounted display, it is to be understood that in alternate embodiments, the head mounted display elements need not be secured or supported by a hard helmet structure, but may instead be supported by a headband or visor structure. The components of the HMD located off the helmet are conventional. Thus, the source of input light is a laser 52 whose output is amplitude modulated by acousto-optical modulator 54. The modulated light is reflected by a polygon scanner 56 and relay mirrors 58 and 60 to the input end 62 of a flat FO ribbon 64. The ribbon 64 typically comprises several hundred to several thousand glass or plastic optical fibers. The scanner 56 scans the laser light beam across the one dimension array of fiber input ends to create the row dimension of the two dimensional television display. The ribbon 64 leads to the helmet 66 worn by the user of the system. Typically the ribbon can have a length of 15 feet leading to the helmet.

A light emitting diode (LED) array can alternatively be substituted for the laser 52, modulator 54, polygon scanner 56 and relay mirrors. Another alternative is to use microlasers, e.g., channel waveguide lasers or vertical emitting cavity lasers, one for each fiber.

Figure 3:
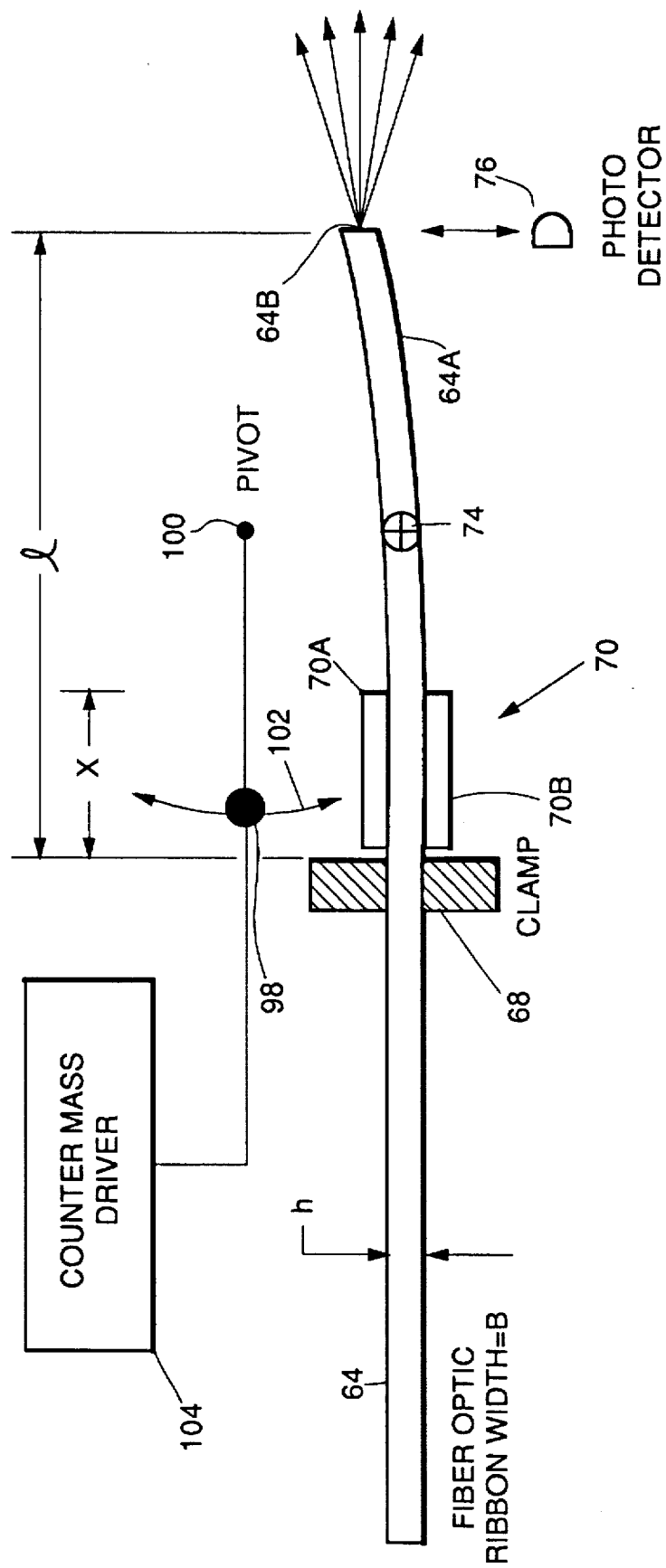
FIG. 3 illustrates the fiber optic ribbon clamp and driver of the HMD of FIG. 2.

The display further includes a means mounted on the helmet to move the output end 64B of the FO ribbon 64 so as to create the second dimension of the television display. In accordance with the invention, and as more particularly shown in FIG. 3, the FO ribbon 64 is clamped a distance L from its output end 64B by a clamp 68. A driver 70 is connected to the ribbon section 64A at a position between the clamp 68 and the ribbon output end 64B, and vibrates the ribbon section along an axis 72 generally orthogonal to the length of the ribbon. The driver vibrates the ribbon at its natural resonant frequency, with the width, thickness and length of the FO ribbon selected to provide a natural resonant frequency equal to the television field rate. The clamp 68 and driver 70 replace the mirror, screen and the galvanometer or mirror faceted polygon used in the conventional HMDs described above to achieve movement of the output end of the FO ribbon.

The light emitted from the output end 64B of the FO ribbon is passed through a conventional projection optics assembly 80 and reflected from the optical combiner 82 comprising the helmet display to the viewer's eye.

The width B and the thickness H of the ribbon 64 is chosen so that the resonant frequency of the cantilevered FO ribbon is equivalent to the television field rate of the display. Thus, the desired resonant frequency in an application employing the standard television field rate in the United States is 60 Hz; the desired resonant frequency would be 50 Hz for applications employing the standard television field rate used in Europe and Japan.

The cantilevered section 64A of the FO ribbon 64 can be considered to be a beam. The formula for the resonant frequency of a cantilevered beam is well known. It is:

$$\text{Angular Natural Frequency} = A((E*I)/(M*L^4))^{1/2}$$

where

E=Young's Modulus

I=Area Moment of Inertia of Beam Cross Section

L=Length of Beam

M=Mass per Unit Length of Beam

A=Coefficient which depends on the vibration mode (for the fundamental mode, A=3.52)

For glass (Young's modulus=$6.7 \times 10^6$ psi), the fundamental resonant frequency is 60 Hz when L=106.68 mm B=20.00 mm H=1.00 mm Other combinations of L, B and H will produce 60 Hz resonance. The exemplary values given above for L, B and H are appropriate for glass FO ribbons and HMDs. The "X" dimension shown in FIG. 3, the distance of the driver from the clamp, can be any distance. The shorter X is, the greater the driving force required. Some exemplary values for X and the driving force for an assumed damping factor "Q" of 20 are shown in Table I, where "Drive Location" is the distance from the fixed end of ribbon section 64A, "Average Disp." is displacement perpendicular to the ribbon at the drive location, "Driving Force" is the force required to move the ribbon end ±6 mm, "Power" is the input power for a damping factor "Q" of 20, and "Maximum Stress" is at the fixed end.

TABLE I

| Drive Location (in.) | Average Disp. (in.) | Driving Force (lb.) | Driving Power (W) | Maximum Stress (psi) |
| --- | --- | --- | --- | --- |
| 0.24706 | 0.001613 | 0.635 | 0.021867 | 7549 |
| 0.49412 | 0.005873 | 0.16 | 0.020066 | 7229 |
| 0.74118 | 0.012419 | 0.0721 | 0.01912 | 6944 |
| 0.98824 | 0.021102 | 0.0415 | 0.018699 | 6777 |
| 1.4824 | 0.043795 | 0.0194 | 0.018142 | 6564 |
| 1.9765 | 0.072475 | 0.0116 | 0.017951 | 6465 |

Because the FO ribbon section 64A resonates at 60 Hz, the size of the driver 70 can be very small. The design of the driver 70, however, is very critical. The preferred ribbon driving system includes thin slices 70A, 70B of piezo ceramic, arranged in opposite polarization, sandwiched to the top and bottom surfaces of the fiber optic ribbon section 64A. For upward motion, the top piezo ceramic slice 70A contracts and the bottom piezo ceramic slice 70B expands. For downward motion, the top piezo ceramic slice 70A expands and the bottom piezo ceramic slice 70B contracts.

Unless dynamically counter balanced, the up-down movement of the ribbon section 64A causes vibration. Dynamic counter balancing consists of moving an equal mass in a direction opposite to the movement of the center of mass 74 of the FO ribbon section. In order to completely eliminate vibration, the mass must move in an arc which is identical to the arc of the center of mass of the FO ribbon section 64A. In one embodiment, this dynamic counter balancing is achieved by shaping the piezo ceramics to deform and move in a direction opposite to the movement of the center of mass 74. Alternatively, a counter mass 98 can be mounted to the helmet for swinging movement about pivot 100, and a driver 104 actuated to vibrate the counter mass in antiphase with the vibration of the ribbon section. Thus, the counter mass 98 is driven by driver 104 to swing in equal and opposite direction to the movement of the center of mass 74 of the ribbon section 64A. The mass of the counter mass 98 is equal to the mass of the cantilevered ribbon section 64A, and the length of the pivot arm is selected to be equal to the distance between the ribbon center of mass 74 and the clamp 68. One technique of driving the counter mass is to use a metal counter mass suspended between two plates, and to energize the plates so as to electrostatically or magnetically attract or repel the mass. The counter mass 98 moves along an arc 102 of about the same size as the arc through which the center of mass 74 moves.

The deflection of the cantilevered FO ribbon section 64A in an exemplary application in which the dimension values of the ribbon are the exemplary values given above is typically ±6 mm. The feedback (servo) control of the deflection is sensed via a photodetector 76 such as a photo transistor. The photodetector is positioned slightly outside the television display area.

The photodetector is also used to synchronize the television video with the phase of the FO ribbon deflection. The FO ribbon deflection versus time relationship is not a linear function. Consequently, the television video must lead or lag a linear reference by a predetermined amount depending on the position of the deflected FO ribbon. This lead or lag is easily calculated. For example, FO ribbon deflection versus time can be calculated using a finite element stress and strain analysis computer program marked under the trademark ANSYS by Swanson Analysis Systems, Houston, Pa. As a first order approximation, the deflection versus time function is proportional to sine ($\omega t$) where $\omega=2\pi$ frequency and t=time.

Implementation of the lead or lag is done by storing several lines of the television video in line buffers. The readout from the line buffers must be synchronized to the FO ribbon deflection. Thus, controller 90 is configured to control the operation of the polygon scanner 56 and driver 70, and receives the photodetector sensor signals from photodetector 76. The video data is output from the video data source 94 into the line buffers 92, which are under control of controller 90. The video data controls the A-O modulator 54, with the polygon scanner operated to scan the modulated laser beam across the input end of the ribbon to sequentially illuminate the input end of each fiber/pixel, thereby creating the first video line, i.e., the first dimension of the television display. The position of successive rows of a given television field is controlled by the movement of the output end 64B of the ribbon. Each traverse of the ribbon end from its topmost position to its lowermost position provides a television field. The driver is then reversed in direction and the ribbon end brought from its lowermost position to the topmost position to commence displaying the next field.

The photodetector is also used to sense unexpected OF ribbon deflection caused by external shock and vibration. The start of the next television field is advanced or retarded depending upon whether the photodetector 76 senses the end of the presently displayed television field early or late.

In order to obtain an 18.4 degree (F/1.5) cone angle of light from the end of the FO ribbon required for an exemplary application, two methods may be used. A high numerical aperture FO ribbon (NA>=0.33) can be used or a scattering coating (similar to the coating on a conventional screen) can be painted on the output end of the OF ribbon. Higher numerical aperture FO ribbons (NA>=0.40) are commercially available. Therefore, use of such higher numerical aperture ribbons is the solution of choice. A coating would typically only be required if the particular HMD required a cone angle that is greater than the arc sine of the fiber optic numerical aperture.

The estimated weight savings of the invention is shown below. All weights are in grams and are "per eye":

| Conventional HMD: | |
|---|---|
| Mirror | 2 |
| Galvo | 120 |
| Mount | 10 |
| Lens | 70 |
| Mount | 46 |
| Screen | 1 |
| Mount | 1 |
| TOTAL | 250 |
| New HMD: | |
| Clamp | 3 |
| Driver | 5 |
| Counter Mass | 12 |
| Ribbon | 6 |

| -continued | |
|---|---|
| Photo Detector | 1 |
| Mount | 1 |
| TOTAL | 28 |

The invention also has utility in applications other than HMDs. Two such applications are rear and front projection display systems, illustrated in FIGS. 4 and 5, wherein the same reference numbers have been used to refer to like elements as in FIGS. 2 and 3. It is noted that the components of the rear and front projection screen systems located downstream from the fiber optic ribbon clamp 68 are identical to the HMD system of FIGS. 2 and 3, and are therefore omitted from FIGS. 4 and 5 for simplicity. Thus, it will be understood that each of the projection systems shown in FIGS. 4 and 5 include the laser 52, modulator 54, scanner 56 and relay mirrors 58 and 60 for producing one axis of modulation on the light input into the input end 64A of the ribbon 64. It will further be understood that the systems of FIGS. 4 and 5 also include a controller 90, buffer 92, video data source 94 for providing control signals and video data signals.

Figure 4:
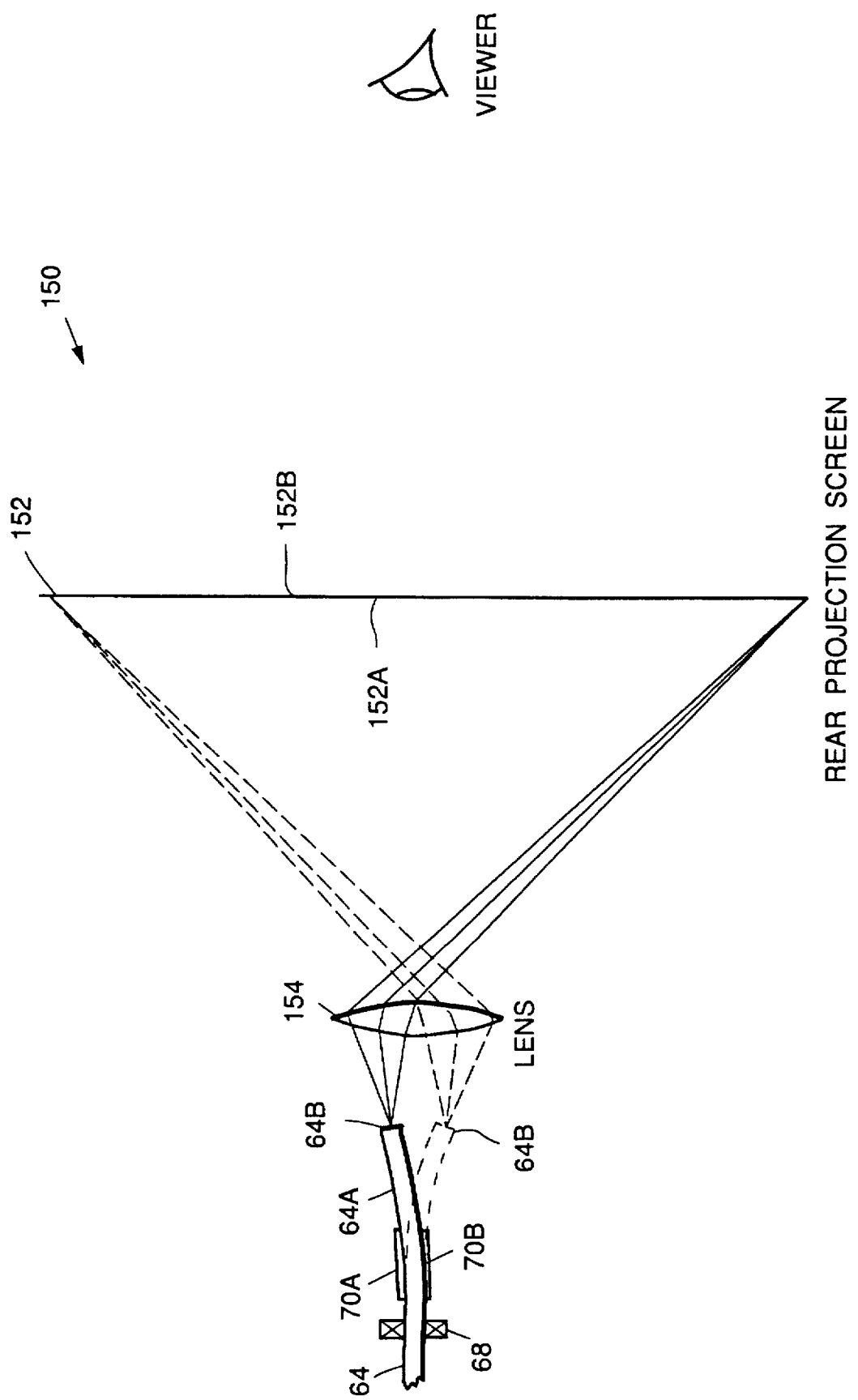
FIG. 4 illustrates a first alternate embodiment of the invention adapted to a rear projection screen application.

FIG. 4 shows elements of a rear projection display 150 where the viewer is facing the projector screen 152. The ribbon 64 is held by the clamp 68 and is made to vibrate at the desired television field rate by the piezoelectric driver comprising top piezo ceramic slice 70A and bottom piezo ceramic slice 70B. A lens 154 images the rectangular raster, formed by the vibrating ribbon end 64B, onto the rear surface 152A of projection screen 152. The projection lens is similar to lenses used in a slide projector, for example, and focuses the image onto the projection screen. The projected image is viewed by the viewer situated on the opposite surface 152B of the projection screen 152. The rear projection screen can be a conventional ground glass diffusing screen, in which the diffusing lobe is symmetrical about the principal (nondirectional) axis. Alternatively, the screen could be an oriented (directional) lenticulated rear projection screen in which the light is directed in a specific chosen direction. The choice of screens is based on factors such as the amount of ambient illumination, off-normal projection arrangement, and location of the viewer relative to the rear projection screen. There are many commercial suppliers of such screens, including Stewart Filmscreen Corporation and Dia Nippon Company. Exemplary applications for rear projection systems include computer monitors.

Figure 5:
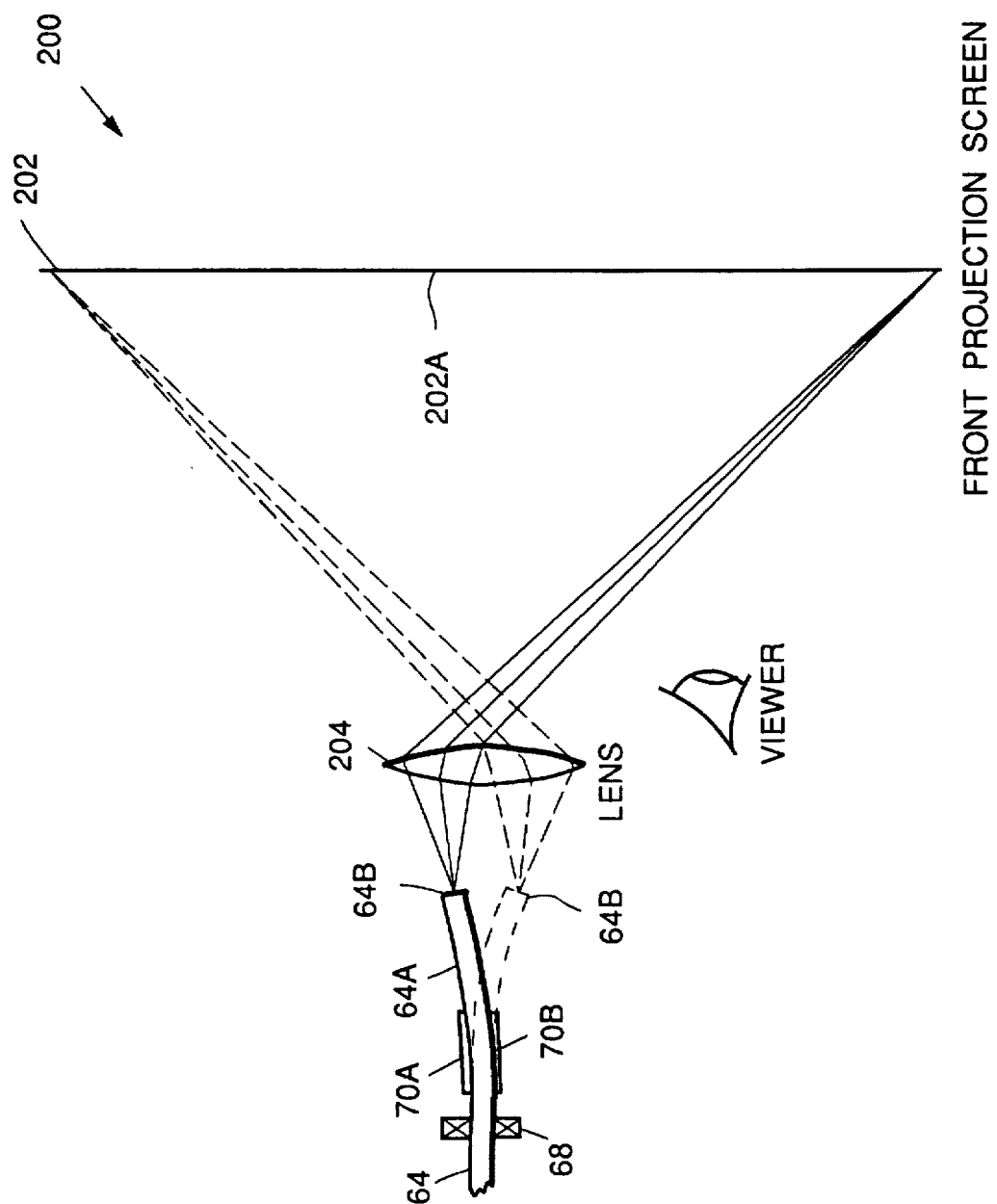
FIG. 5 illustrates a second alternative embodiment of the invention adapted to a front projection screen application.

FIG. 5 shows a front projection display 200 where the viewer and the projector are located on the same side 202A of the projection screen 202. The method of creating the display image is the same as that described above for FIG. 4, but the location of the viewer is different. As in the rear projection system of FIG. 4, a lens 204 is used to image the raster-generated image from the vibrating fiber optic ribbon end 64B onto the reflective surface 202A of the screen. As with rear projection screens, there are typically two types of front projection screens, non-directional and directional screens. The non-directional screens can, for example, be matter white, aluminized smooth, aluminized textured, lenticular or beaded. Front projection screens suitable for the purpose are available, for example, from Stewart Filmscreen Corporation. Front projection applications include auditoriums and theaters.

Figure 6:
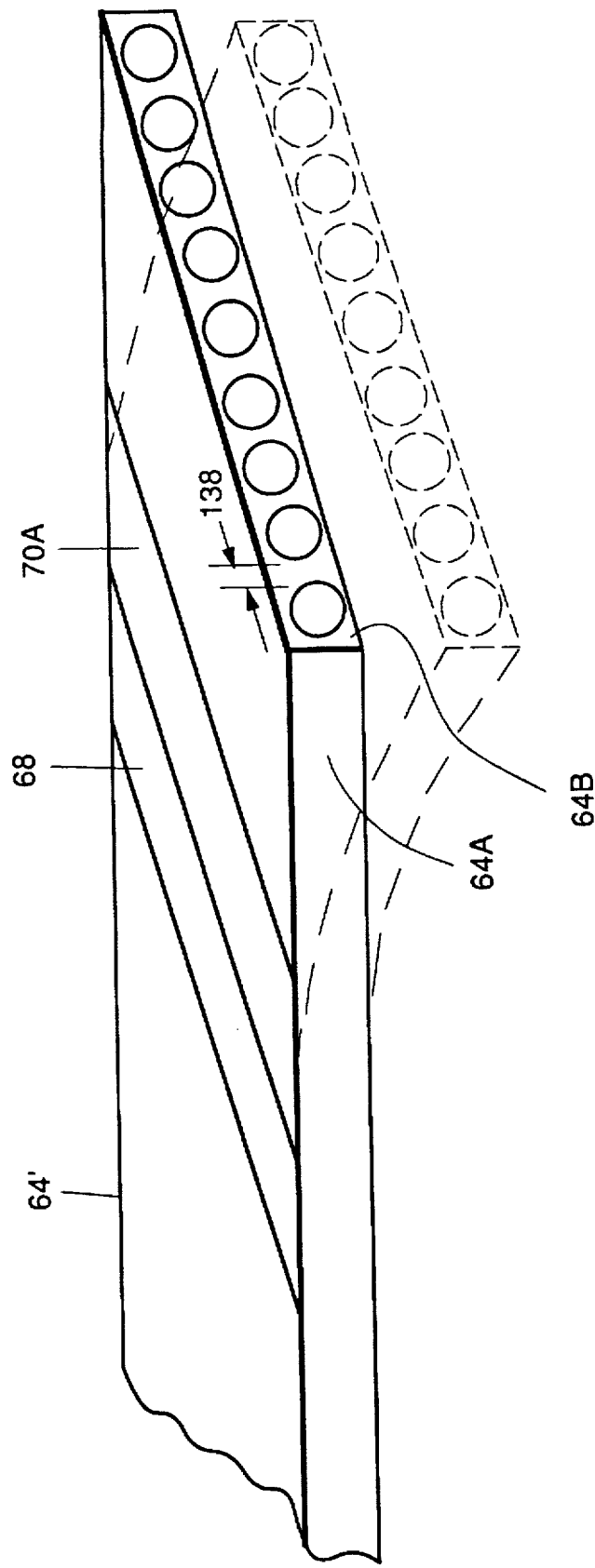
FIG. 6 illustrates the manner by which a rectangular display is created by scanning a line of pixels.
Figure 7A:
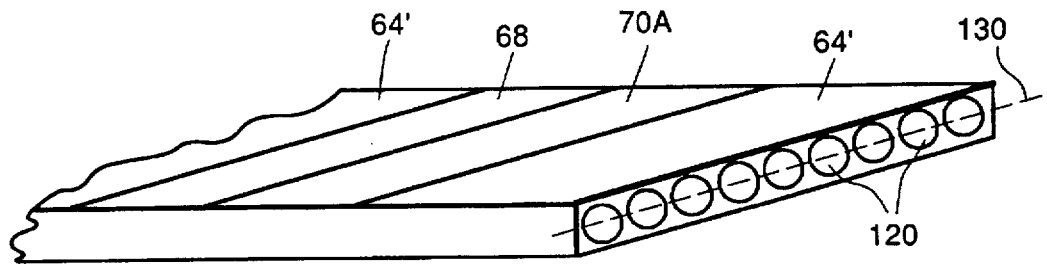
FIGS. 7A–7C respectively illustrate three different fiber arrangements which may be employed in this invention.
Figure 7B:
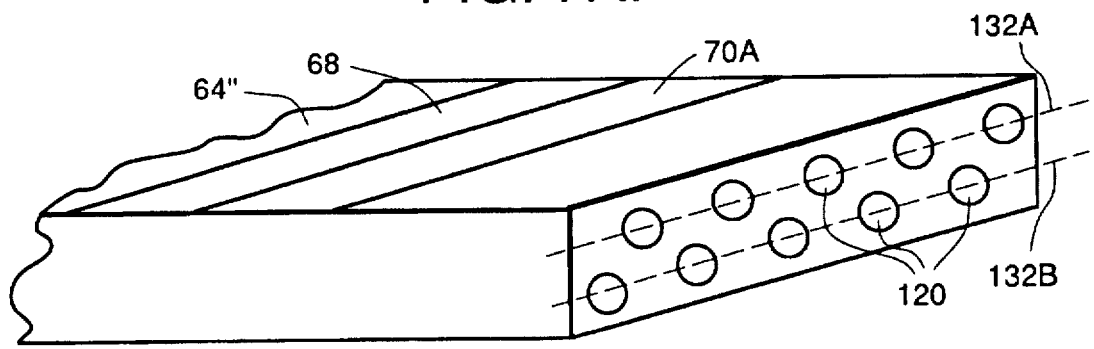
Figure 7C:
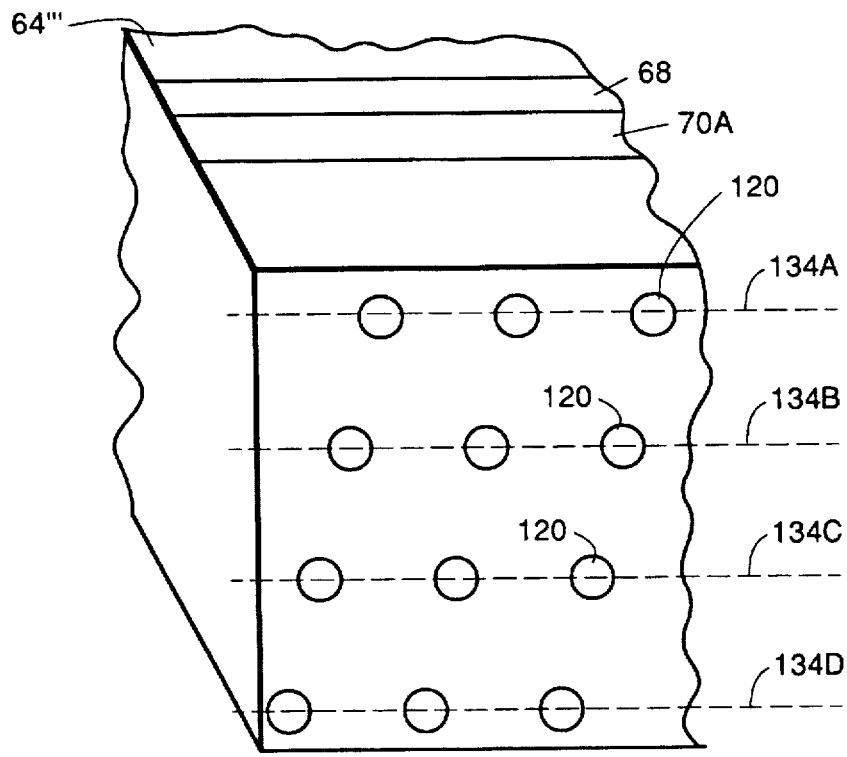

FIG. 6 illustrates the manner in which a rectangular raster is created by the vibration of the ribbon 64. Three ribbon embodiments are shown in FIGS. 7A–7C. FIG. 6, as well as FIG. 7A, shows a ribbon 64' comprising a single row 130 of optical fibers 120. The single row ribbon 64' generally creates an image with vertical black lines as a result of the gaps 138 in between the active fibers 120. This problem can be overcome by a multi-row fiber optic ribbon. FIG. 7B shows a fiber optic ribbon 64" having two fiber rows 132A and 132B, arranged on an offset so that the fibers of the two rows provide 100% overlap. FIG. 7C illustrates a fiber optic ribbon 64''' having four rows 134A–134D of optical fibers 120, staggered to provide zero gap between adjacent pixels, such that the gap 138 is zero. The purpose of the staggering is to maximize distance (horizontal, diagonal and vertical) to adjacent pixels (fibers). In both the two row and four ribbons 64" and 64''', the rows are arranged such that when the ribbon is vibrated, a continuous (100% overlap) image is drawn.

To facilitate manufacture of the optical fiber ribbons and to couple the light into the fibers, it may be desirable to use a multi-row ribbon design.

The optical fiber 64' having a single row of fibers 120 (FIG. 7A) is probably best suited for laser light sources, such as a channel waveguide laser.

The ribbons 64" and 64''' having two or four rows of fibers (FIGS. 7B and 7C) are best suited for light emitting diode (LED) light sources. A problem associated with LED sources is that the diodes need to be separated. Otherwise, light "leaks" through the LED substrate from one diode to the next and reduces the image contrast. If four rows of fibers are used as shown in FIG. 7C, the separation of adjacent diodes is four times the pixel pitch, i.e., four times the nominal pixel separation distance. For example, if the pixel pitch is 8 microns, the diode separation in a single row is 32 microns in the along-axis direction. Ideally, the row-to-row spacing should also be at least 32 microns.

The thickness of the optical fiber ribbon can increase in going from a single row to a two or four row ribbon. The practical minimum thickness for a four row ribbon presently is about 0.15 mm.

It is much easier to fabricate two rows of fibers than it is to fabricate a ribbon with a single row of fibers. One method is to coat the top and bottom faces of the ribbon with photoresist, photo or x-ray lithograph to expose the resist, and then etch grooves into the top and bottom faces. The grooves are subsequently filled with material of higher index of refraction than the index of refraction of the ribbon. The filled grooves (pixels) guide the light from the input end of the ribbon to its output end. Note that the shape of the fibers can be round, square, half-round or any other shape. The fibers may be on the top and bottom surfaces of the ribbons or "buried" inside the ribbon. The fibers can be "buried" by attaching cover plates to the top and bottom surfaces of the ribbon after the grooves are filled.

Another fabrication method is to extrude the ribbon through a die that has grooves (notches) in its top and bottom surfaces.

There are reports in the literature of researchers using Excimer (UV) lasers to locally change (reduce) the index of refraction of the ribbon to make fibers. For example, one exemplary paper describing UV laser writing of optical waveguides is "Photochemical Formation of Polymeric Optical Waveguides and Devices for Optical Interconnection Applications," Beeson, K. W. et al., SPIE Vol. 1374, Integrated Optics and Optoelectronics II (1990), pages 176–185. Such a technique could also be used to fabricate the fiber ribbon.

To fabricate a ribbon having four rows of fibers, one technique is to assemble (glue together) three ribbons. The center ribbon has no fibers; it is just a spacer. The two outer ribbons are each two fiber row ribbons.

Figure 8:
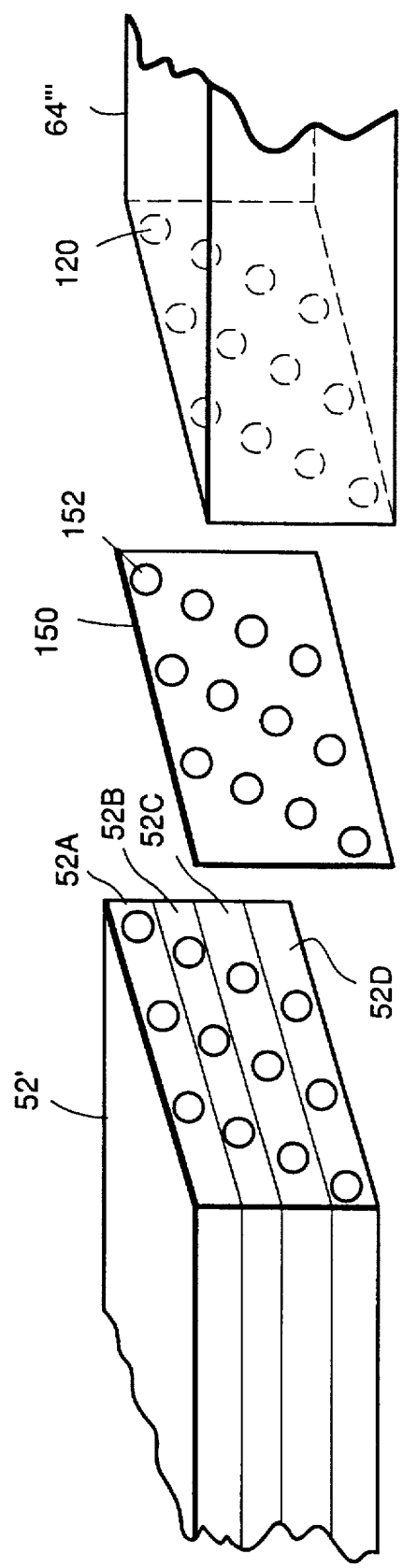
FIG. 8 illustrates a multi-row input light source for a multi-row fiber ribbon implementation.

In the two, three or four row ribbon implementations, there are also two, three or four rows of light sources. FIG. 8 shows an example for a four row ribbon 64''', where the light source 52' is a stack of four channel waveguide lasers 52A–52D, coupled to the four row ribbon 64''' by a microlens array 150 comprising a plurality of microlenses 152. Such lens arrays are commercially available, e.g., from Teledyne Brown Engineering. The preferred telecentric configuration is a sandwich of two microlens arrays. In the multi-row fiber arrangement, the first dimension of modulation is achieved by internal modulation of the lasers in the respective stack, i.e., by varying the power input to the lasers. In this case, the A-O modulator 54 and polygon scanner 56 are not required.

It is understood that the above-described embodiment is merely illustrative of the possible specific embodiments which may represent principles of the present invention. Other arrangements may readily be devised in accordance with these principles by those skilled in the art without departing from the scope and spirit of the invention.

What is claimed is:

1. A two-dimensional fiber optic projection display system, comprising:
   an array of flexible light conductors arranged in a ribbon having an input end and an output end, said array of flexible light conductors comprising a plurality of rows of optical fibers, wherein fibers in a given row are offset relative to corresponding fibers in an adjacent row to provide overlap of output ends of said light conductors and improve image quality;
   means for injecting light into said input end of said ribbon to create a first dimension of said two-dimensional display;
   means for moving said output end of said ribbon, said means comprising:
      clamping means for clamping said ribbon at a location spaced from said output end to create a cantilevered ribbon section; and
      driver means for vibrating said cantilevered ribbon section to deflect said output end of said ribbon;
   a projection screen; and
   means for imaging an image produced by said vibrating output end of said ribbon onto said projection screen for viewing by an observer.

2. The display system of claim 1 wherein said imaging means comprises an optical lens interposed between said output end of said ribbon and said projection screen.

3. The display system of claim 1 wherein said projection screen is a rear projection screen, wherein said imaging means projects light from said output end of said ribbon onto a first surface of said screen, and said observer views said image at a second opposite surface of said screen, wherein said display system is a rear projection system.

4. The display system of claim 1 wherein said projection screen is a front projection screen wherein said imaging means projects light from said output end of said ribbon onto a first front surface of said screen, and said observer views said image at said first front surface.

5. The display system of claim 1 wherein said driver means comprising first and second piezo ceramic slices arranged in opposite polarization and sandwiched to respective top and bottom surface regions of the cantilevered ribbon section, and a piezo electric exciter for exciting the first and second piezo ceramic slices, said exciter for causing the first slice to contract while causing the second slice to expand to achieve motion of the ribbon section in a first direction, and for causing the first slice to expand and the second slice to contract to achieve motion of the ribbon section in a second direction.

6. The display system of claim 1 further comprising a counterbalancing mass, and means for vibrating said counterbalancing mass in antiphase to vibrational movement of said cantilevered ribbon section to reduce vibration induced in said clamping means as a result of said vibrational movement of said cantilevered ribbon section.

7. The display system of claim 6 wherein said counterbalancing mass has a mass value substantially equal to a mass value associated with said ribbon section, and said counterbalancing mass is supported for swinging movement about a pivot point in an equal and opposite movement to vibrational movement of a center of mass of said cantilevered ribbon section.

8. The display system of claim 1 wherein said display has a pixel pitch characteristic, said plurality of aligned rows consists of a first row and a second row separated by a spacing of twice said pitch.

9. The display system of claim 8 wherein optical fibers within each said first and second row are separated by a nominal separation distance of twice said pitch.

10. The display system of claim 1 wherein said display has a pixel pitch characteristic, said plurality of aligned rows consists of first, second, third and fourth rows, and wherein adjacent rows are separated by a nominal spacing of four times said pixel pitch.

11. The display system of claim 1 wherein said light injecting means comprises a plurality of light emitting diodes.

12. The display system of claim 1 wherein said cantilevered ribbon section is characterized by a natural resonant frequency, and said driver means vibrates said ribbon section substantially at said resonant frequency.

13. The display system of claim 12 wherein length, width and thickness dimensions of said ribbon section are selected so as to provide a desired natural resonant frequency.

14. The display system of claim 13 wherein said display is characterized by a television field rate, and said driver means comprises means for vibrating said ribbon section at said television field rate.

15. The display system of claim 14 wherein said natural resonant frequency of said cantilevered ribbon section is substantially equal to said television field rate.

16. The display system of claim 1 wherein said display is characterized by a television field rate, and said driver means comprises means for vibrating said ribbon section at said television field rate.

17. The display system of claim 16 further comprising means for sensing said deflection of said output end of said ribbon and means responsive to said sensing means for controlling said driver means to synchronize said deflection to operation of said light injecting means.

18. The display system of claim 17 wherein said sensing means comprises a photodetector disposed to receive light from said output end of said ribbon.

19. The display system of claim 1 wherein said light conductors comprise optical fibers.

20. The display system of claim 19 wherein said optical fibers are high numerical aperture fibers.

21. The display system of claim 1 wherein said light injecting means comprises means for scanning a modulated light beam across said ends of said light conductors at said input end of said ribbon.

22. The display system of claim 21 wherein said light injecting means further comprises a laser for generating a laser light beam and means for amplitude modulating said beam to produce said modulated light beam.

23. The display system of claim 1 wherein said cantilevered ribbon section is characterized by a center of mass location which moves as said ribbon section is vibrated, and wherein said driver means has a driver mass associated therewith, said driver means being operated so as to move said driver mass in a direction opposite to movement of said center of mass location of said ribbon, thereby reducing vibration.

24. The display system of claim 23 wherein said center of mass location is moved along an arc during said vibration of said ribbon section, and wherein said driver mass is moved along an arc during operation thereof.

25. The display system of claim 1 further comprising a screen scattering coating applied at said output end of said ribbon.

26. A two-dimensional fiber optic display system, comprising:

an array of flexible light conductors arranged in a ribbon having an input end and an output end;

means for injecting light into said input end of said ribbon to create a first dimension of said two-dimensional display;

means for moving said output end of said ribbon to create said second dimension, said means comprising:

clamping means for clamping said ribbon at a location spaced from said output end to create a cantilevered ribbon section; and driver means for vibrating said cantilevered ribbon section to deflect said output end of said ribbon, said driver means comprising first and second piezo ceramic slices arranged in opposite polarization and sandwiched to respective top and bottom surface regions of the cantilevered ribbon section, and a piezo electric exciter for exciting the first and second piezo ceramic slices, said exciter for causing the first slice to contract while causing the second slice to expand to achieve motion of the ribbon section in a first direction, and for causing the first slice to expand and the second slice to contract to achieve motion of the ribbon section in a second direction.

27. A two-dimensional fiber optic display system, comprising:

an array of flexible light conductors arranged in a ribbon having an input end and an output end;

means for injecting light into said input end of said ribbon to create a first dimension of said two-dimensional display;

means for moving said output end of said ribbon to create said second dimension, said means comprising:

clamping means for clamping said ribbon at a location spaced from said output end to create a cantilevered ribbon section; and driver means for vibrating said cantilevered ribbon section to deflect said output end of said ribbon; and dynamic counterbalancing apparatus for dynamically counterbalancing said system to minimize vibration imparted to said clamping means as a result of vibrational movement of said cantilevered ribbon section, said counterbalancing apparatus including a counter-balancing mass and a means for vibrating said counter-balancing mass in antiphase to the vibrational movement of said cantilevered ribbon section.

28. The display system of claim 27 wherein said driver means comprising first and second piezo ceramic slices arranged in opposite polarization and sandwiched to respective top and bottom surface regions of the cantilevered ribbon section, and a piezo electric exciter for exciting the first and second piezo ceramic slices, said exciter for causing the first slice to contract while causing the second slice to expand to achieve motion of the ribbon section in a first direction, and for causing the first slice to expand and the second slice to contract to achieve motion of the ribbon section in a second direction.

29. The display system of claim 27 wherein said array of flexible light conductors is a single row of optical fibers.

30. The display system of claim 29 wherein said light injecting means comprises a laser light source.

31. The display system of claim 27 wherein said array of flexible light conductors comprises a plurality of rows of optical fibers, wherein fibers in a given row are offset relative to corresponding fibers in an adjacent row to provide overlap between output ends of said flexible light conductors.

32. The display system of claim 31 wherein said display has a pixel pitch characteristic, said plurality of aligned rows consists of a first row and a second row separated by a spacing of twice said pitch.

33. The display system of claim 32 wherein optical fibers within each said first and second row are separated by a nominal separation distance of twice said pitch.

34. The display system of claim 31 wherein said display has a pixel pitch characteristic, said plurality of aligned rows consists of first, second, third and fourth rows, and wherein adjacent rows are separated by a nominal spacing of four times said pixel pitch.

35. The display system of claim 31 wherein said light injecting means comprises a plurality of light emitting diodes.

36. The display system of claim 27 wherein said cantilevered ribbon section is characterized by a natural resonant frequency, and said driver means vibrates said ribbon section substantially at said resonant frequency.

37. The display system of claim 36 wherein length, width and thickness dimensions of said ribbon section are selected so as to provide a desired natural resonant frequency.

38. The display system of claim 37 wherein said display is characterized by a television field rate, and said driver means comprises means for vibrating said ribbon section at said television field rate.

39. The display system of claim 38 wherein said natural resonant frequency of said cantilevered ribbon section is substantially equal to said television field rate.

40. The display system of claim 27 wherein said display is characterized by a television field rate, and said driver means comprises means for vibrating said ribbon section at said television field rate.

41. The display system of claim 40 further comprising means for sensing said deflection of said output end of said ribbon and means responsive to said sensing means for controlling said driver means to synchronize said deflection to operation of said light injecting means.

42. The display system of claim 41 wherein said sensing means comprises a photodetector disposed to receive light from said output end of said ribbon.

43. The display system of claim 27 wherein said light conductors comprise optical fibers.

44. The display system of claim 43 wherein said optical fibers are high numerical aperture fibers.

45. The display system of claim 27 wherein said light injecting means comprises means for scanning a modulated light beam across said ends of said light conductors at said input end of said ribbon.

46. The display system of claim 45 wherein said light injecting means further comprises a laser for generating a laser light beam and means for amplitude modulating said beam to produce said modulated light beam.

47. The display system of claim 27 wherein said cantilevered ribbon section is characterized by a center of mass location which moves as said ribbon section is vibrated, and wherein said driver means has a driver mass associated therewith, said driver means being operated so as to move said driver mass in a direction opposite to movement of said center of mass location of said ribbon, thereby reducing vibration.

48. The display system of claim 47 wherein said center of mass location is moved along an arc during said vibration of said ribbon section, and wherein said driver mass is moved along an arc during operation thereof.

49. The display system of claim 27 further comprising a screen scattering coating applied at said output end of said ribbon.

50. The display system of claim 27 wherein said counterbalancing mass has a mass value substantially equal to a mass value associated with said ribbon section, and said counterbalancing mass is supported for swinging movement about a pivot point in an equal and opposite movement to vibrational movement of a center of mass of said cantilevered ribbon section.

* * * * *